(12) United States Patent
Guo et al.

(10) Patent No.: US 11,552,818 B2
(45) Date of Patent: Jan. 10, 2023

(54) RELAY DEVICE AND MULTI-SPLIT AIR-CONDITIONING CONTROL SYSTEMS

(71) Applicants: Qingdao Haier Air-conditioning Electronic Co., Ltd, Shandong (CN); Haier Smart Home Co., Ltd., Shandong (CN)

(72) Inventors: Defang Guo, Qingdao (CN); Benhai Yuan, Qingdao (CN); Ruigang Zhang, Qingdao (CN); Bin Shi, Qingdao (CN); Baitian Zhuo, Qingdao (CN); Shaojiang Cheng, Qingdao (CN); Jun Wang, Qingdao (CN)

(73) Assignees: Qingdao Haier Air-conditioning Electronic Co., Ltd, Qingdao (CN); Haier Smart Home Co., Ltd., Qingdao (CN)

( * ) Notice: Subject to any disclaimer, the term of this patent is extended or adjusted under 35 U.S.C. 154(b) by 0 days.

(21) Appl. No.: 17/047,894

(22) PCT Filed: Jan. 21, 2019

(86) PCT No.: PCT/CN2019/072552
§ 371 (c)(1),
(2) Date: Oct. 15, 2020

(87) PCT Pub. No.: WO2019/205754
PCT Pub. Date: Oct. 31, 2019

(65) Prior Publication Data
US 2021/0167990 A1    Jun. 3, 2021

(30) Foreign Application Priority Data
Apr. 24, 2018  (CN) .......................... 201810372146.7

(51) Int. Cl.
*H04L 67/125* (2022.01)
*H04L 12/40* (2006.01)
*H04L 5/00* (2006.01)

(52) U.S. Cl.
CPC ...... *H04L 12/40019* (2013.01); *H04L 5/0007* (2013.01); *H04L 5/0048* (2013.01); *H04L 12/40032* (2013.01); *H04L 12/40182* (2013.01)

(58) Field of Classification Search
CPC . H04L 12/40019; H04L 5/0007; H04L 29/06; H04L 24/12; H04L 12/10; H04L 69/14
See application file for complete search history.

(56) References Cited

U.S. PATENT DOCUMENTS

2006/0123811 A1* 6/2006 Ha ........................... F24F 11/62
                                                                  62/175
2006/0212175 A1* 9/2006 Kim ....................... H04L 12/66
                                                                  700/277
(Continued)

FOREIGN PATENT DOCUMENTS

CN    101436971 A    5/2009
CN    102340895 A    2/2012
(Continued)

OTHER PUBLICATIONS

International Search Report dated Apr. 19, 2019 in corresponding International Application No. PCT/CN2019/072552; 4 pages.

*Primary Examiner* — Abdelnabi O Musa
(74) *Attorney, Agent, or Firm* — Maier & Maier, PLLC

(57) ABSTRACT

A relay device and a multi-split control system that achieve reliable communication between an outdoor air conditioning unit and multiple indoor units under the condition that the length of a communication bus is limited. The system expands the communication distance by a cascade path formed by a plurality of relay devices. The cascade path transmits control signals sent by a master control device/a specific slave control device (i.e. a slave control device communicating with the master control device or certain relay device) to corresponding slave control devices one by (Continued)

one, and the corresponding slave control devices transmit the signals to the master control device/specific slave control device according to a response signal fed back by the control signal, where the relay devices may respectively communicate with a source node device and a destination node device on the basis of the master-slave type communication mode.

9 Claims, 2 Drawing Sheets

(56) References Cited

U.S. PATENT DOCUMENTS

| | | | |
|---|---|---|---|
| 2006/0287774 A1* | 12/2006 | Yoon | G05B 15/02 |
| | | | 700/276 |
| 2008/0049718 A1* | 2/2008 | Chindapol | H04B 7/15592 |
| | | | 370/351 |
| 2011/0128905 A1* | 6/2011 | Kawauchi | H04W 88/04 |
| | | | 370/315 |
| 2016/0360467 A1* | 12/2016 | Kotake | H04L 67/12 |
| 2020/0021461 A1* | 1/2020 | Endo | H04L 12/40013 |

FOREIGN PATENT DOCUMENTS

| | | |
|---|---|---|
| CN | 104896658 A | 9/2015 |
| CN | 106679062 A | 5/2017 |
| CN | 107426050 A | 12/2017 |
| CN | 108696309 A | 10/2018 |
| EP | 1 906 600 A1 | 4/2008 |

* cited by examiner

RELAY DEVICE AND MULTI-SPLIT AIR-CONDITIONING CONTROL SYSTEMS

FIELD

The present disclosure relates to the technical field of communication control of a multi-connection air conditioning system, and specifically to a relay device and a multi-connection control system.

BACKGROUND

In a multi-connection air conditioning system, each outdoor unit can communicate with a plurality of indoor units; for example, each outdoor unit can communicate with 64 indoor units. Specifically, the outdoor unit communicates with the indoor units in a master-slave communication mode. The outdoor unit, serving as a host machine, sends query instructions to some or all indoor units. The indoor units, serving as slave machines, can only feedback response information to the outdoor unit according to the query instructions, and the indoor units cannot communicate with each other. Based on the master-slave communication mode, although one outdoor unit can manipulate a plurality of indoor units, the number of indoor units is often limited by the length of a communication bus (the longer the communication bus is, the greater an attenuation degree of its transmitted signals will be, so the length of the communication bus has an upper limit). At the same time, in a scene with a complex spatial structure, normal communication between the outdoor unit and the indoor units cannot be realized due to the limitation of the length of the communication bus.

In order to overcome the defect of limited length of the communication bus, the patent application for invention with publication number CN104896658A discloses a communication method for an air conditioning system, in which a certain indoor unit can be used as a relay to realize the communication between other indoor units and the outdoor unit, thereby solving the problem of communication distance. However, when the relay indoor unit transmits the data of the unit itself and other indoor units at the same time, it is very easy to cause its network transmission congestion, and even cause transmission failure, thus resulting in a poor stability.

SUMMARY

In order to solve the above-mentioned problems in the related art, that is, to solve the technical problem of how to achieve reliable communication between an outdoor unit and a batch of indoor units when the length of a communication bus is limited, the present disclosure provides a relay device and a multi-connection control system.

In the first aspect, the relay device in the present disclosure includes a communication module configured to communicate with a preset source node device and preset destination node devices respectively based on a master-slave communication mode.

Further, in a preferred technical solution provided by the present disclosure:

the communication module includes:

a first communication unit, which is configured to receive a first control signal sent by the source node device through the master-slave communication mode, and send a first response signal fed back from the destination node device corresponding to the first control signal to the source node device; and a second communication unit, which is configured to send the first control signal to the destination node device corresponding to the first control signal through the master-slave communication mode, and receive the first response signal fed back from the destination node device according to the first control signal.

Further, in a preferred technical solution provided by the present disclosure is:

the communication module is further configured to communicate with a specific destination node device; wherein the specific destination node device is a destination node device communicatively connected with the source node device directly;

in this case, the first communication unit is further configured to receive a second control signal sent by the specific destination node device, and send a second response signal fed back from the destination node device corresponding to the second control signal to the specific destination node device; and the second communication unit is further configured to send the second control signal to the destination node device corresponding to the second control signal, and receive the second response signal fed back from the destination node device according to the second control signal.

Further, in a preferred technical solution provided by the present disclosure:

the first communication unit is further configured to, based on a competitive signal transmission method, send the first response signal fed back from the destination node device to the source node device or send the second response signal fed back from the destination node device to the specific destination node device.

Further, in a preferred technical solution provided by the present disclosure:

the competitive signal transmission method includes:

simultaneously sending all target response signals to a target node device in a preset competition time slot;

detecting data transmitted in a channel in real time, and judging whether currently transmitted data of each of the target response signals is the same as the detected data; and if the currently transmitted data of a certain target response signal is different from the detected data, stopping sending the target response signal and resending the target response signal in the next competition time slot;

wherein when the target node device is the source node device, the target response signal is the first response signal; and when the target node device is the specific destination node device, the target response signal is the second response signal.

Further, in a preferred technical solution provided by the present disclosure:

the relay device further includes a verification module configured to verify whether the first control signal, the second control signal, the first response signal, or the second response signal are correct;

in this case, the first communication unit is further configured to send the first response signal to the source node device after it is verified to be correct or send the second response signal to the specific destination node device after it is verified to be correct; and the second communication unit is further configured to send the first control signal or the second control signal to the corresponding destination node device after the first control signal or the second control signal is verified to be correct.

Further, in a preferred technical solution provided by the present disclosure:

the relay device further includes a buffer module configured to buffer the first response signal and the second response signal received by the second communication unit.

In a second aspect, a multi-connection control system of the present disclosure includes a master control device, a relay device, and a plurality of slave control devices;

the relay device includes a first communication unit and a second communication unit;

the master control device is communicatively connected with part of the slave control devices and with the first communication unit; and the second communication unit is communicatively connected with the other part of the slave control devices;

the first communication unit is configured to receive a first control signal sent by the master control device, and send a first response signal fed back from the slave control device corresponding to the first control signal to the master control device; and the second communication unit is configured to send the first control signal to the slave control device corresponding to the first control signal, and receive the first response signal fed back from the corresponding slave control device according to the first control signal.

Further, in a preferred technical solution provided by the present disclosure:

the relay device is provided in plural, and the plurality of relay devices are cascaded to form a cascade path; the first relay device in the cascade path is communicatively connected with the master control device directly, and each of the relay devices is communicatively connected with part of the slave control devices;

the cascade path is configured to transmit the first control signal sent by the master control device or a second control signal sent by a specific slave control device to a corresponding slave control device step by step, and transmit the first response signal fed back from the corresponding slave control device according to the first control signal to the master control device step by step or transmit a second response signal fed back from the corresponding slave control device according to the second control signal to the specific slave control device step by step;

wherein the specific slave control device is a slave control device communicatively connected with the master control device or a certain relay device directly.

Further, in a preferred technical solution provided by the present disclosure:

the specific slave control device is configured to compete to send the first response signal to the master control device or compete to send the second response signal to the corresponding relay device.

As compared with the closest related art, the above technical solutions have at least the following advantageous effects:

1. In the present disclosure, the relay device can communicate with the preset source node device and the preset destination node devices respectively based on the master-slave communication mode. Specifically, the first communication unit communicates with the source node device through the master-slave communication mode (that is, the relay device serves as a slave device of the source node device), so that the relay device can receive a control signal issued by the source node device and feed a response signal back to the source node device. The second communication unit communicates with the destination node device through the master-slave communication mode (that is, the relay device serves as a master device of the destination node device), so that the relay device can send a control signal to the destination node device and receive a response signal fed back from the destination node device.

2. In the present disclosure, the relay device can also communicate with a specific destination node device (that is, a destination node device communicatively connected with the source node device directly), so that the relay device can directly communicate with other slave devices of the source node device without the aid of the source node device.

3. In the present disclosure, the relay device can, based on a competitive signal transmission method, send the first response signal fed back from the destination node device to the source node device or send the second response signal fed back from the destination node device to the specific destination node device. In other words, the relay device can simulate the competitive signal transmission process of the destination node device competing to send the response signal.

4. The multi-connection control system of the present disclosure can expand the communication distance through a cascade path formed by a plurality of relay devices. Specifically, the cascade path can transmit the first control signal sent by the master control device or the second control signal sent by a specific slave control device (that is, a slave control device communicatively connected with the master control device or a certain relay device directly) to the corresponding slave control device step by step, and transmit the first response signal fed back from the corresponding slave control device according to the first control signal to the master control device step by step or transmit the second response signal fed back from the corresponding slave control device according to the second control signal to the specific slave control device step by step.

DETAILED DESCRIPTION

Preferred embodiments of the present disclosure will be described below with reference to the drawings. It should be understood by those skilled in the art that these embodiments are only used to explain the technical principles of the present disclosure and are not intended to limit the scope of protection of the present disclosure.

The relay device in the embodiment of the present disclosure will be described below with reference to the accompanying drawings.

Figure 1:
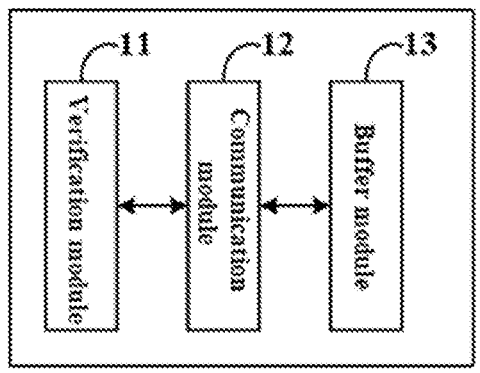
FIG. 1 is a schematic diagram of the main structure of a relay device in an embodiment of the present disclosure.

Reference is made to FIG. 1, which exemplarily shows the main structure of the relay device in this embodiment. As shown in FIG. 1, the relay device in this embodiment may include a verification module 11, a communication module 12 and a buffer module 13.

Specifically, the communication module 12 in this embodiment may include a first communication unit and a second communication unit, and the communication module 12 may be configured to communicate with a preset source node device and preset destination node devices respectively based on a master-slave communication mode. The first communication unit may be configured to receive a first control signal sent by the source node device through the master-slave communication mode, and send a first response signal fed back from the destination node device corresponding to the first control signal to the source node device. The second communication unit may be configured to send the first control signal to the destination node device corresponding to the first control signal through the master-slave communication mode, and receive the first response signal fed back from the destination node device according to the first control signal.

In this embodiment, communication data (such as the first control signal or the first response signal) of the relay device is mainly composed of a pilot code, a length code, an address code, a command code, a data body, and a check code. The pilot code refers to a pilot head configured to synchronize each frame of data; the length code indicates the total length of a frame of data; the command code indicates command information contained in the communication data (such as a control command of the source node device to the destination node device, or a response command of the destination node device to the source node device); the address code refers to the address number of the source node device or the destination node device; the data body refers to various data information in the communication data; and the check code refers to a check mark of the communication data.

In this embodiment, the verification module 11 may be configured to verify whether the first control signal and the first response signal are correct. Correspondingly, the first communication unit is further configured to send the first response signal to the source node device after it is verified to be correct. The second communication unit is further configured to send the first control signal to the corresponding destination node device after it is verified to be correct. The buffer module 13 may be configured to buffer the first response signal received by the second communication unit.

In this embodiment, the first communication unit communicates with the source node device through a master-slave communication mode (that is, the relay device serves as a slave device of the source node device), so that the relay device can receive a control signal issued by the source node device and feed a response signal back to the source node device. The second communication unit communicates with the destination node device through the master-slave communication mode (that is, the relay device serves as a master device of the destination node device), so that the relay device can send a control signal to the destination node device and receive a response signal fed back from the destination node device.

Further, the communication module 12 of the relay device shown in FIG. 1 in this embodiment may be further configured to communicate with a specific destination node device. The specific destination node device refers to a destination node device communicatively connected with the source node device directly.

Specifically, the first communication unit in this embodiment may be configured to receive a second control signal sent by the specific destination node device, and send a second response signal fed back from the destination node device corresponding to the second control signal to the specific destination node device. The second communication unit may be configured to send the second control signal to the destination node device corresponding to the second control signal, and receive the second response signal fed back from the destination node device according to the second control signal.

In this embodiment, the verification module 11 may be further configured to verify whether the second control signal and the second response signal are correct. Correspondingly, the first communication unit is further configured to send the second response signal to the specific destination node device after it is verified to be correct. The second communication unit is further configured to send the second control signal to the corresponding destination node device after it is verified to be correct. The buffer module 13 may be further configured to buffer the second response signal received by the second communication unit.

In this embodiment, when the first communication unit communicates with the source node device through the master-slave communication mode (that is, the relay device serves as a slave device of the source node device), it can also communicate with the specific destination node device, so that the relay device can directly communicate with other slave devices of the source node device without the aid of the source node device.

Further, in this embodiment, the first communication unit may be further configured to, based on a competitive signal transmission method, send the first response signal fed back from the destination node device to the source node device or send the second response signal fed back from the destination node device to the specific destination node device.

In a preferred implementation of this embodiment, the competitive signal transmission method may include the following steps:

Step S101: simultaneously sending all target response signals to a target node device in a preset competition time slot. Specifically, when the target node device is the source node device, the target response signal is the first response signal. When the target node device is the specific destination node device, the target response signal is the second response signal.

Step S102: detecting data transmitted in a channel in real time, and judging whether currently transmitted data of each of the target response signals is the same as the detected data, wherein if the currently transmitted data of a certain target response signal is the same as the detected data, step S103 is executed, and if the currently transmitted data of a certain target response signal is different from the detected data, step S104 is executed.

Step S103: continuing to send this target response signal.

Step S104: stopping sending this target response signal and resending this target response signal in the next competition time slot.

Step S105: repeating the above steps until all the target response signals are sent to the target node device (i.e., the source node device or the specific target node device).

In this embodiment, when the second communication unit communicates with the destination node device through the master-slave communication mode (that is, the relay device serves as a master device of the destination node device), the relay device uses the competitive signal transmission method to send the response signal to the source node device or the specific destination node device, so that the competitive signal transmission process of the destination node device can be simulated.

A multi-connection control system in an embodiment of the present disclosure will be described below with reference to the accompanying drawings.

Figure 2:
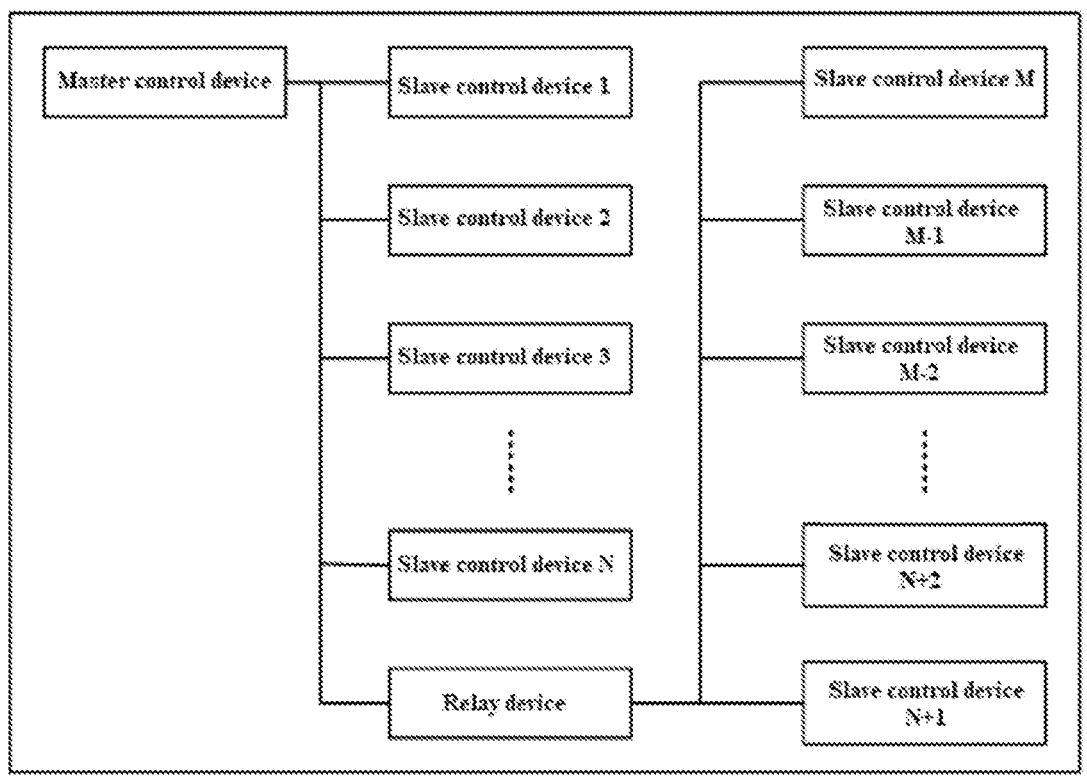
FIG. 2 is a schematic diagram of the main structure of a multi-connection control system in an embodiment of the present disclosure.

Reference is made to FIG. 2, which exemplarily shows the main structure of a multi-connection control system in this embodiment. As shown in FIG. 2, the multi-connection control system in this embodiment may include a master control device, a relay device, and a plurality of slave control devices (slave control devices 1 to M shown in FIG. 2).

Specifically, the relay device in this embodiment may include a first communication unit and a second communication unit. The master control device may be communicatively connected with part of the slave control devices (slave control devices 1 to N as shown in FIG. 2) and with the first communication unit. The second communication unit may be communicatively connected with the other part of the slave control devices (slave control devices N+1 to M as shown in FIG. 2).

In this embodiment, the first communication unit may be configured to receive the first control signal sent by the master control device, and send the first response signal fed back from the slave control device corresponding to the first control signal to the master control device. The second communication unit may be configured to send the first control signal to the slave control device corresponding to the first control signal, and receive the first response signal fed back from the corresponding slave control device according to the first control signal. In a preferred implementation of this embodiment, the relay device shown in FIG. 2 may be the relay device shown in FIG. 1 in the foregoing embodiment. For the specific working process of the relay device in this embodiment, reference may be made to the working process of the relay device in the foregoing embodiment of the relay device. For the sake of brevity, repeated description will not be given herein.

Figure 3:
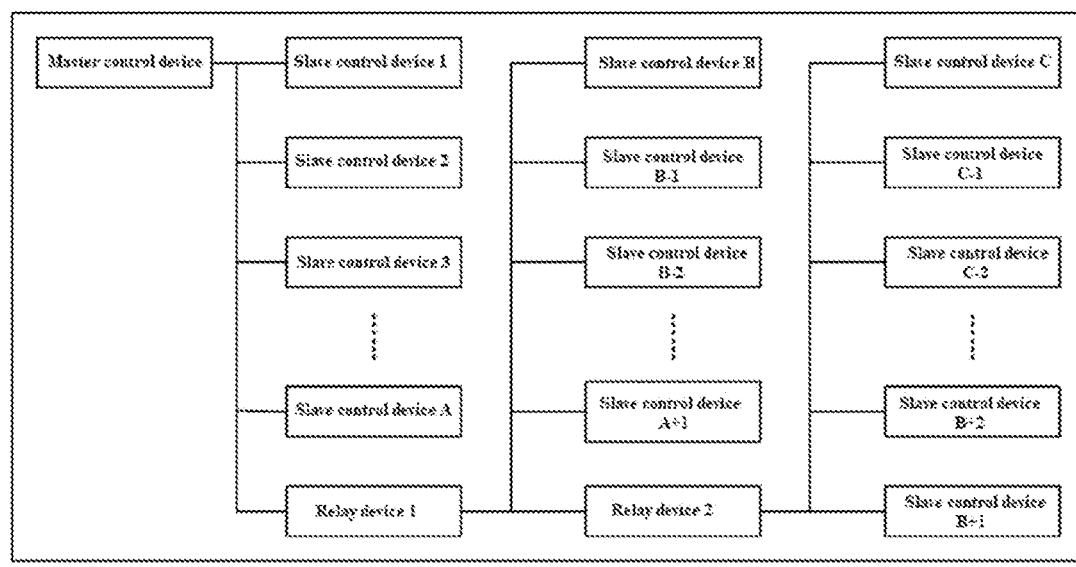
FIG. 3 is a schematic diagram of the main structure of another multi-connection control system in an embodiment of the present disclosure.

Reference is next made to FIG. 3, which exemplarily shows the main structure of another multi-connection control system in this embodiment. As shown in FIG. 3, the multi-connection control system in this embodiment may include a master control device, a plurality of relay devices (relay device 1 and relay device 2 shown in FIG. 3) and a plurality of slave control devices (slave control device 1 to slave control device C shown in FIG. 3).

Specifically, the plurality of relay devices in this embodiment may be cascaded with each other to form a cascade path, wherein the first relay device in the cascade path is communicatively connected with the master control device directly, and each of the relay devices is communicatively connected with part of the slave control devices. As shown in FIG. 3, in the cascade path formed by the relay device 1 and the relay device 2, the relay device 1 is communicatively connected with the master control device directly and is also communicatively connected with the slave control devices A+1 to the slave control device B respectively, and the relay device 2 is communicatively connected with the slave control device B+1 to the slave control device C respectively.

In this embodiment, the cascade path may be configured to transmit the first control signal sent by the master control device or the second control signal sent by the specific slave control device to the corresponding slave control device step by step, and transmit the first response signal fed back from the corresponding slave control device according to the first control signal to the master control device step by step or transmit the second response signal fed back from the corresponding slave control device according to the second control signal to the specific slave control device step by step.

For example, in the cascade path, the relay device 1 sends the first control signal to the relay device 2 and the slave control devices A+1 to B, and the relay device 2 then sends the first control signal to the slave control devices B+1 to C. For another example, the relay device 2 sends the first response signal fed back from the slave control devices B+1 to C according to the first control signal to the relay device 1, and the relay device 1 sends the first response signal to the master control device.

In this embodiment, the specific slave control device refers to a slave control device communicatively connected with the master control device or a certain relay device directly (as shown in FIG. 3, for the relay device 1, the specific slave control device is the slave control device 1 to the slave control device A; and for the relay device 2, the specific slave control device is the slave control devices A+1 to the slave control device B). In a preferred implementation of this embodiment, the specific slave control device may be configured to compete to send the first response signal to the master control device or compete to send the second response signal to the corresponding relay device. Specifically, in this implementation, a conventional competitive signal transmission method in the field of communication technology can be used to compete to send the first response signal to the master control device or compete to send the second response signal to the corresponding relay device.

Those skilled in the art can understand that although some embodiments described herein include certain features included in other embodiments instead of other features, combinations of features of different embodiments are intended to be within the scope of the present disclosure and form different embodiments. For example, in the claims of the present disclosure, any one of the claimed embodiments may be used in any combination.

It should be noted that the above embodiments are intended to illustrate the present disclosure rather than limiting it, and those skilled in the art may design alternative embodiments without departing from the scope of the appended claims. The word "comprising" does not exclude the presence of elements or steps not listed in the claims The word "a" or "an" preceding an element does not exclude the presence of a plurality of such elements. The present disclosure can be implemented by means of hardware comprising several different elements and by means of a suitably programmed PC. In a unit claim enumerating several modules, some of these modules may be specifically embodied by the same hardware item.

Hitherto, the technical solutions of the present disclosure have been described in conjunction with the preferred embodiments shown in the accompanying drawings, but it is easily understood by those skilled in the art that the scope of protection of the present disclosure is obviously not limited to these specific embodiments. Without departing from the principle of the present disclosure, those skilled in the art can make equivalent changes or replacements to relevant technical features, and the technical solutions after these changes or replacements will fall within the scope of protection of the present disclosure.

What is claimed is:

1. A relay device, comprising:
   a communication module configured to communicate with a preset source node device and preset destination node devices, respectively, based on a master-slave communication mode, wherein the communication module comprises:
   a first communication unit configured to receive a first control signal sent by the source node device through the master-slave communication mode where the relay device serves as a slave device of the source node device, and send to the source node device a first response signal fed back from the destination node device corresponding to the first control signal; and a second communication unit configured to send the first control signal to the destination node device corresponding to the first control signal through the master-slave communication mode where the relay device serves as a master device of the destination node device, and receive the first response signal fed back from the destination node device according to the first control signal, wherein the relay device is able to simulate a competitive signal transmission process of the destination node device competing to send the first response signal.

2. The relay device according to claim 1, wherein: the communication module is further configured to communicate with a specific destination node device; wherein the specific destination node device is a destination node device communicatively connected with the source node device directly;

in this case, the first communication unit is further configured to receive a second control signal sent by the specific destination node device, and send a second response signal fed back from the destination node device corresponding to the second control signal to the specific destination node device; and the second communication unit is further configured to send the second control signal to the destination node device corresponding to the second control signal, and receive the second response signal fed back from the destination node device according to the second control signal.

3. The relay device according to claim 2, wherein the first communication unit is further configured to, based on a competitive signal transmission method, send the first response signal fed back from the destination node device to the source node device or send the second response signal fed back from the destination node device to the specific destination node device.

4. The relay device according to claim 3, wherein the competitive signal transmission method comprises:

simultaneously sending all target response signals to a target node device in a preset competition time slot;

detecting data transmitted in a channel in real time, and judging whether currently transmitted data of each of the target response signals is the same as the detected data; and stopping sending the target response signal and resending the target response signal in the next competition time slot, responsive to determining that the currently transmitted data of a certain target response signal is different from the detected data; wherein when the target node device is the source node device, the target response signal is the first response signal; and when the target node device is the specific destination node device, the target response signal is the second response signal.

5. The relay device according to claim 2, wherein the relay device further comprises a verification module which is configured to verify whether the first control signal, the second control signal, the first response signal or the second response signal are correct;

in this case, the first communication unit is further configured to send the first response signal to the source node device after it is verified to be correct or send the second response signal to the specific destination node device after it is verified to be correct; and the second communication unit is further configured to send the first control signal or the second control signal to the corresponding destination node device after the first control signal or the second control signal is verified to be correct.

6. The relay device according to claim 2, wherein the relay device further comprises a buffer module configured to buffer the first response signal and the second response signal received by the second communication unit.

7. A multi-connection control system, comprising:

a master control device, a relay device, and a plurality of slave control devices; wherein the relay device comprises a first communication unit and a second communication unit; wherein the master control device is communicatively connected with part of the slave control devices and with the first communication unit; and the second communication unit is communicatively connected with the other part of the slave control devices; wherein the first communication unit is configured to receive a first control signal sent by the master control device through the master-slave communication mode where the relay device serves as a slave device of the source node device, and send a first response signal fed back from the slave control device corresponding to the first control signal to the master control device; and wherein the second communication unit is configured to send the first control signal to the slave control device corresponding to the first control signal through the master-slave communication mode where the relay device serves as a master device of the destination node device, and receive the first response signal fed back from the corresponding slave control device according to the first control signal; and wherein the relay device is able to simulate a competitive signal transmission process of the slave control devices competing to send the first response signal.

8. The multi-connection control system according to claim 7, wherein: the relay device is provided in plural, and the plurality of relay devices are cascaded to form a cascade path; the first relay device in the cascade path is communicatively connected with the master control device directly, and each of the relay devices is communicatively connected with part of the slave control devices; and the cascade path is configured to transmit the first control signal sent by the master control device or a second control signal sent by a specific slave control device to a corresponding slave control device step by step, and transmit the first response signal fed back from the corresponding slave control device according to the first control signal to the master control device step by step or transmit a second response signal fed back from the corresponding slave control device according to the second control signal to the specific slave control device step by step; wherein the specific slave control device is a slave control device communicatively connected with the master control device or a certain relay device directly.

9. The multi-connection control system according to claim 8, wherein the specific slave control device is configured to compete to send the first response signal to the master control device or compete to send the second response signal to the corresponding relay device.

\* \* \* \* \*